United States Patent
Lahuerta Romeo

(10) Patent No.: US 10,781,576 B2
(45) Date of Patent: Sep. 22, 2020

(54) FOR DILUTING OR CONCENTRATING SOLUTIONS, APPLIED TO PROCESSES FOR THE DESALINATION OF WATER

(71) Applicant: TEMPERO 2000, S.L., Saragossa (ES)

(72) Inventor: Manuel Lahuerta Romeo, Saragossa (ES)

(73) Assignee: Tempero 2000, S.L., Saragossa (ES)

( * ) Notice: Subject to any disclaimer, the term of this patent is extended or adjusted under 35 U.S.C. 154(b) by 0 days.

(21) Appl. No.: 15/573,064

(22) PCT Filed: May 12, 2015

(86) PCT No.: PCT/ES2015/070379
§ 371 (c)(1),
(2) Date: Jul. 25, 2018

(87) PCT Pub. No.: WO2016/180993
PCT Pub. Date: Nov. 17, 2016

(65) Prior Publication Data
US 2018/0328006 A1    Nov. 15, 2018

(51) Int. Cl.
*E21B 43/20*    (2006.01)
*E21B 43/08*    (2006.01)
(Continued)

(52) U.S. Cl.
CPC ............. *E03B 3/16* (2013.01); *B01D 61/025* (2013.01); *B01D 61/08* (2013.01); *C02F 1/441* (2013.01); *E03B 5/045* (2013.01); *E03B 5/06* (2013.01); *B01D 2311/02* (2013.01); *B01D 2311/04* (2013.01); *B01D 2313/04* (2013.01); *B01D 2313/10* (2013.01); *B01D 2313/20* (2013.01);
(Continued)

(58) Field of Classification Search
CPC ........ E21B 43/20; E21B 43/24; E21B 43/385; E21B 43/08; E21B 43/126; E21B 43/128; E21B 43/36
See application file for complete search history.

(56) References Cited

FOREIGN PATENT DOCUMENTS

| EP | 1161981 | 12/2001 |
| ES | 2094697 | 1/1997 |
| ES | 1070065 U | * 6/2009 |

OTHER PUBLICATIONS

International Preliminary Examination Report (English Translation) for PCT/ES2015/070379. (Year: 2016).*

(Continued)

*Primary Examiner* — Zakiya W Bates
(74) *Attorney, Agent, or Firm* — Bourque & Associates

(57) ABSTRACT

A method for the desalination of water, carried out in one embodiment on the basis of a borehole (4) in permeable coastal land, in which two internal wells (5, 6) are interconnected at the bottom, by means of a membrane packet (9), disposed such that the supply flow provided via the borehole (4) flows in a downward direction by the suction of a motor pump (7) installed at a shallow depth inside the well (5), with an ascending flow, pouring same to the marine outlet and the diluted flow (permeate) drains from the membrane packets (9) to the second well (6), which is hollow and at atmospheric pressure, where a motor pump (8) extracts the permeate for the use thereof, while in another embodiment the membrane packets (15) may be disposed in ducts hanging from a floating platform anchored in the sea or other salty water.

4 Claims, 2 Drawing Sheets

(51) Int. Cl.
  *E21B 21/06* (2006.01)
  *E03B 3/16* (2006.01)
  *B01D 61/08* (2006.01)
  *B01D 61/02* (2006.01)
  *C02F 1/44* (2006.01)
  *E03B 5/04* (2006.01)
  *E03B 5/06* (2006.01)
  *C02F 103/08* (2006.01)

(52) U.S. Cl.
  CPC .... *B01D 2313/24* (2013.01); *B01D 2313/243* (2013.01); *B01D 2315/06* (2013.01); *C02F 2103/08* (2013.01); *C02F 2201/004* (2013.01); *C02F 2301/02* (2013.01); *C02F 2301/04* (2013.01); *Y02A 20/131* (2018.01)

(56) References Cited

OTHER PUBLICATIONS

International Search Report, PCT/ES2015/070379, ISA/ES, dated Jan. 8, 2016.
Carboneras Desalinization Plant Description and English Translation, 2005.
Commercial Desalination Technologies, pp. 94-101, book cover and English translation, 2009.
Brackish Waters and Seawater Desalation. Reverse osmosis, pp. 105, 106, 107, 135, 136 book covers Medina, 1999 English translation included.

* cited by examiner

FOR DILUTING OR CONCENTRATING SOLUTIONS, APPLIED TO PROCESSES FOR THE DESALINATION OF WATER

THE SUBJECT-MATTER OF THE INVENTION

The objective of the present descriptive memory is to describe a new method for diluting or concentrating solutions applied to processes for the desalination of water, that is, in order to obtain the production of fresh water from seawater or salty water. This is done by using the reverse osmosis in a new method with a lower energy demand and a lower environmental impact, as they are subterranean or seabed plants with a low recovery rate, and therefore with more diluted brines than in traditional plants.

With this method, it is possible to deal with short-term demands of freshwater near the coast, either for an industrial, mining, agricultural or livestock use, due to the fast implementation and the reduced energy costs, less than 1.8 kWh/m3, with a lower maintenance because of collecting cleaner water on the basis of a borehole, and because of not using complex mechanical components such as the high pressure pump, turbine-booster, and high pressure tubes.

Finally, the method described in the present invention is also applicable to other types of acuosus fluids where concentration of dilution is required.

FIELD OF APPLICATION

The field of application of the present invention is within the industrial processes for the desalination of water, and it particularly comprehends all membrane separation processes, either to concentrate or dilute. For example, this is the case of obtaining freshwater from seawater or salty water, or obtaining concentrates for the industry.

This method allows the use of medium-sized and more sustainable subterranean or seabed plants due to their low energy demand and their reduced environmental impact.

BACKGROUND OF THE INVENTION

There is a large number of publications all over the world about the method of water desalinization, since obtaining drinking water is one of the biggest aspirations in the history of mankind, as it is a scarce commodity coming from an almost infinite water supply source.

Among the more recent publications concerning this subject matter, with respect to the seawater desalination by means of reverse osmosis, see the book "Brackish Waters and Seawater Desalation. Reverse Osmosis" (English translation of "Desalación de aguas salobres y de mar. Osmosis inversa" by J. A. Medina with ISBN-84-7114-849-8 published by Mundi Prensa, and the book "Green Energy and Technology" Commercial Desalinization Technologies pages 94-101 with ISBN-978-3-642-0449-8 published by Springer in 2009.

Both publications give more complex and ineffective solutions than the suggestions made in this patent application.

An additional attempt at solving the problem addressed by the disclosed invention is the desalination plant of Carboneras, based in Almeria (Spain), which has a maximum production capacity of 120.000 m3/per day, and an installed power of 30 MW. In 2005, it had an investment cost of 131.7 million euros, and it is working successfully with a specific energy consumption of 4.25 kWh/m3 of product water, for a retrofitting ratio of 45%. The designed project in 1999 took more than 5 years to be implemented. A major problem with the prior art systems is that the specific investment optimised cost for a large-sized plant is generally on the order of 1.097,€/m3/per day.

Throughout the development of the present invention, a comparison will be made between the results of the present invention and those of the referred plant of Carboneras. It will be seen that the method that the present invention provides offers new solutions and important energy savings.

Problems in prior art systems concerning desalination in a land well beside the coast include the high expenses regarding the huge civil engineering works that are needed to build the large diameter well, and due to the problems and cost in order to guarantee the water tightness next to the sea.

On the contrary, in the present invention, the well should be very permeable in order to have a good supply of salty water and to reduce the dynamic level drops during the functioning process of the plant.

DESCRIPTION OF THE INVENTION

The method and means for diluting or concentrating solutions applied to processes for the desalination of seawater or salty water that the present invention advocates for, is in itself regarded as a remarkable novelty within the field of application. This is so due to fact that it achieves the objectives previously mentioned, of which distinctive technical, structural and setup details are explained hereafter, and they are embodied in the annexed claims that accompany the present descriptive memory.

The membranes used for the seawater treatment by means of the reverse osmosis method are evolving from day to day until reaching higher quantities and qualities of the product water thanks to a constant technological improvement.

The membranes placed in the market are in the form of pipes with different diameters that are formed by the spiral wound of an active area of around 44 m2 with an intermediate separator where the permeate will drain towards a central manifold producing the wound from a 100% tangential feed flow. This way, approximately a percentage of 10% of a more diluted water (permeate) and 90% of a more concentrated water (brine) is produced whenever the pressure, or preferably, the different pressure conditions between the feed flow and the permeate flow exceeds the osmotic pressure of the feed water.

The nominal working conditions for a reverse osmosis membrane for seawater or salty water are:
Feed flow 32.000 ppm
Pressure 600 PSI=41.3 bar
Feed water temperature 25° C.
Permeate flow rate 10% of the feed flow rate
Range pH 6.5-7
Retrofits that could reach over 40% will be obtained if several membranes inside a tube are grouped in series. The feed flow rate of each membrane will be a lower one and it will have a higher concentration than the previous one, that is why the first one permeates 10%, the second one 9%, and so on.

A membrane has three distinctive flows (channels) in order of magnitude:
a) Channel 1: Entrance of the feed flow (100%) at a pressure greater than the osmotic one.
b) Channel 2: Exit of the concentrate flow (90%) (at pressure, in line with the feed flow), that in desalination processes is returned to the sea by means of an outlet. In other applications, when seeking to concentrate, this flow will be the goal to be searched for.

c) Channel 3: Exit of the most diluted flow (10%) so called permeate flow at low pressure (similar to the atmospheric pressure) that, in one embodiment, will drain to a bottom atmospheric pressure chamber connected to the permeate duct where a motor pump extracts it for the use thereof.

Therefore, a spiral membrane has three channels or tubes, an entrance and two exits.

In accordance with the present invention, when drilling a deep well on a permeable coastal land or in the seabed, two ducts are installed, each of the three tubes (the two ducts and the space between the external duct and the well jacket in land and the two ducts and the own sea in the seabed) are interconnected to each of the three membrane channels creating in this way the conditions for the osmosis process to be performed.

As this interconnection will be done from at the bottom of the well, which is full of water, the required pressure (1 bar for each 10 m of water column) for the reverse osmosis process will be achieved.

The track 1 will be connected to the borehole at the bottom, the track 2 are connected to one of the ducts and the track 3 to the other duct.

Because of the track 1, the feed flow, and the track 2, the concentrate flow (brine) being interconnected through the spiral wound of the membrane, both create a communicating vessels system and thus they will have the same static level.

In order to cause the flow in this system, the suction using a motor pump submerged at a shallow depth in the duct of the brine (channel 2) is enough to, due to the slope, be able to cause the required flow between channels 1 and 2. This flow should go longitudinally through the membrane, starting this way the reverse osmosis process, as, because of the channel 3 being interconnected to the third duct, which is at atmospheric pressure, the permeate will flow draining to a bottom atmospheric pressure chamber connected towards this third duct, where a motor pump installed at the bottom will extract the permeate to the surface for the use thereof.

The present invention makes it possible to create these working conditions on the basis of the described method which is the patent by means of a borehole. This borehole produces the feed flow generated by the suction of a motor pump which is located at a shallow depth of the wellhead. This is carried out using the principle of the communicating vessels.

On the opposite, the permeate flow (channel 3) should be pumped from the bottom of the other duct, so that it could absorb in this process 90% of the total required power.

Another embodiment of the same method, when circumstances require so, it will be performed in the sea taking advantage of the depth of the sea bed where both ducts are installed, as well as the membrane packet, hanging from a floating platform which is anchored to the sea bed. The permeate duct is in this case substituted by a hosepipe from the sea bottom to the coast or land to be reclaimed for use as desalinized water. This alternative opens up the opportunity to design high-performance desalination plants because of not being limited by the borehole diameter.

On the basis of the above, the present method represents an innovation of unprecedented constructive and functional characteristics for the intended purpose.

DESCRIPTION OF THE DRAWINGS

In order to complete the present description for the purpose of helping to better understand the invention characteristics, the present memory is accompanied, as an integral part of it, by a set of drawings in which, with illustrative and non-restrictive purposes, the following is represented.

Mark 1.—Represents the feed flow of the raw water to treat (100%) (channel 1).

Mark 2.—Represents the highest salt concentrate exit flow (90%) which is also called brine or rejected water that will supply the following membrane to in the end be returned to the sea through a marine outlet (channel 2).

Mark 3.—Shows the most diluted exit feed (permeate) that goes through the membrane and it flows through the central manifold of the membrane (channel 3).

Figure 1:
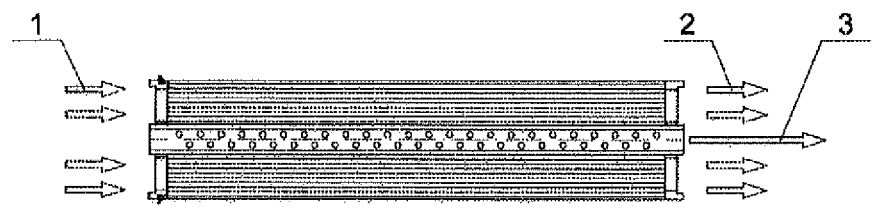
FIG. 1.—Shows a section of a tubular membrane part by the longitudinal axis in which the direction of the existing three types of flows (channels) are shown in which the following marks can be seen.
Figure 2:
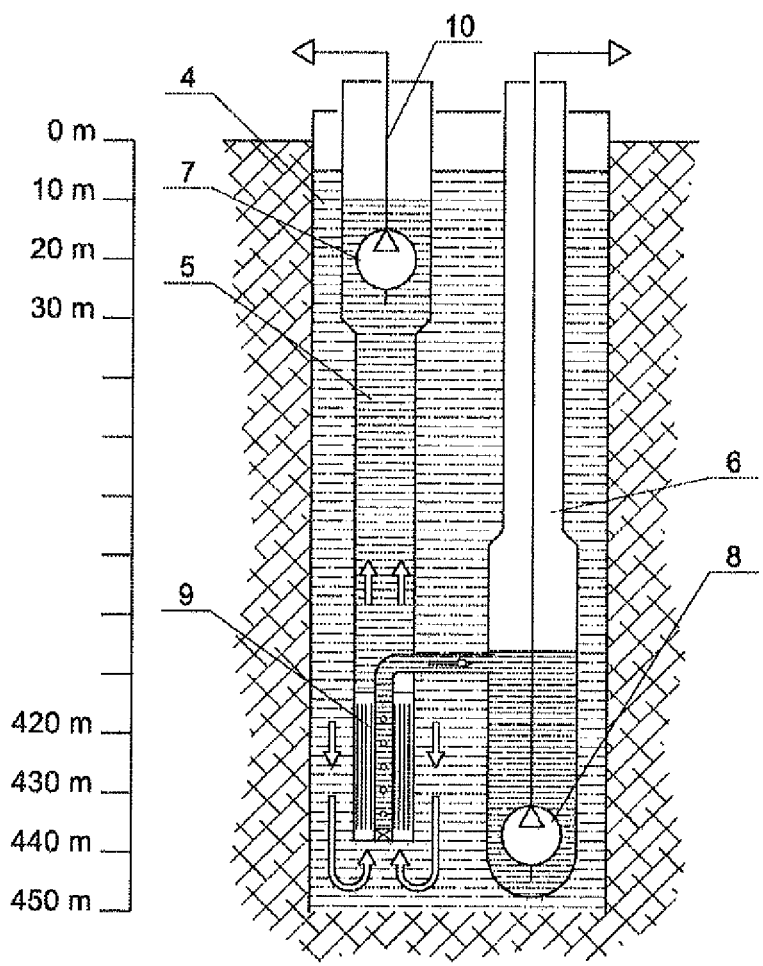

FIG. 2.—Is a general scheme of the method which is the object of the present patent is represented, in which the difference between the dynamic levels among the three ducts (the two concentric ducts plus the duct obtained with the external pipe and the jacketed wall of the well) can be seen with the following marks and meaning.

Mark 4.—Represents the biggest diameter borehole on land, on a stable and permeable land (preferably a rocky one) where the two concentric pipes are installed. Each of the three ducts obtained is interconnected to one of the three membrane channels.

Specifically, the borehole (4) directly connects the feed flow to the channel 1 of the membrane as the arrows indicate.

Mark 5.—Represents the duct of the concentrate with an ascending flow. As the arrows indicate in the drawing, the dynamic level is slightly lower than the borehole level because of being interconnected through the channel 2, after the flow has gone through the membrane spiral.

Mark 6.—Represents the duct of the permeate, which is connected through the channel 3 of the membrane, in which it is deposited (drained) without pressure inside the duct, which is closed at the bottom. It forms this way a permeate collection container, which is connected through the top to the surface in order to achieve a correct suction.

Mark 7.—Represents the symbol of the submerged motor pump in the well (5) of the concentrate, which is in charge from the suction to the outlet. Its functioning causes a level drop inside the borehole that forces the flow, through channel 1, thorough the membrane using the principle of the communicating vessels.

Mark 8.—Represents the symbol of the submerged motor pump in the well (6) of the permeate, which is in charge from the water product extraction to the surface, overtaking the load due to the depth.

Mark 9.—Represents the membrane packet which is installed inside a tube in which the direction of the three flows can be seen.

Mark 10.—is a brine evacuation duct to the marine outlet

Figure 3:
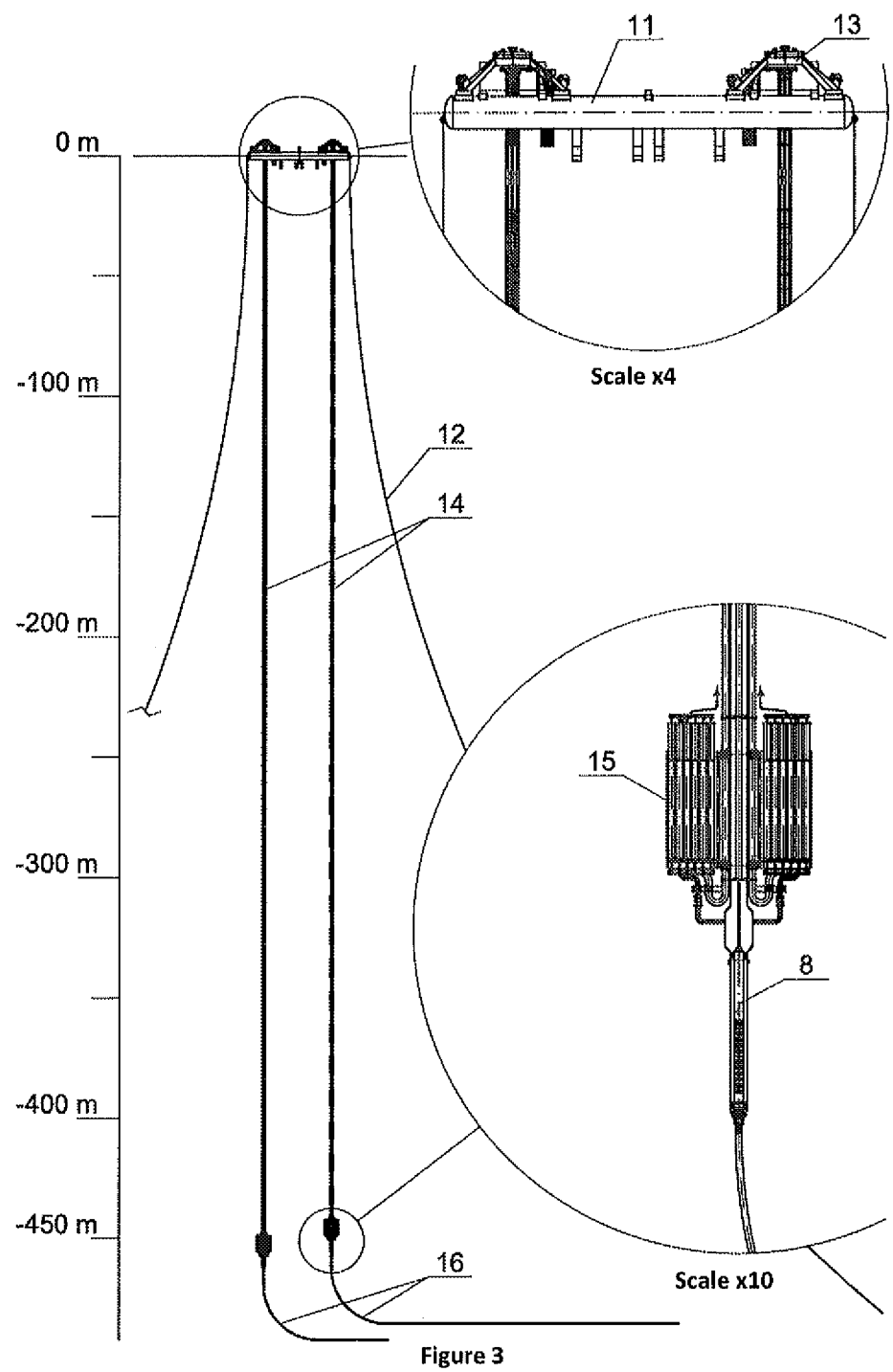

FIG. 3.—Is a cross-section view of the floating platform with the anchors and two headframes from which ducts wells (14) are articulately hanging (duct of the concentrate+well of the permeate) at a depth of 450 m.

Around each well (14), at the bottom, the membrane packet (15) can be found with the corresponding connexions to each duct (see the below enlarged detail).

At the bottom of each of the two ducts of the permeate there is the motor pump (8) of the permeate extraction that is inverted-mounted in order to produce the permeate water extraction thorough two hosepipes (16) which pass along the sea bed to the coast for the use thereof.

PREFERRED EMBODIMENT OF THE INVENTION

The objective of the present description is to describe and claim the method and means for diluting or concentrating solutions applied to processes for the desalination of water, that is to say, to obtain the production of fresh water from seawater or salty water by using a reverse osmosis method with a lower energy demand and a lower environmental impact in one of the possible embodiment; that is, the embodiment in the case of coastal lands.

It involves obtaining the maximum permeate flow possible for the minimum energy cost by using the reverse osmosis method.

It is here searched a better quality of 350 ppm, at year zero with water at 22° C. and a salinity in the entrance flow of 32.000 ppm.

The well is created in 30 days, reaching the static level of the water at 4 m, which happens to meet the ground level. Rocky and stable lands are gone through, and in the first 10 m of the borehole the diameter has increased to 680 mm and the lands were then piped and cemented. The distance to the coast was 80 m.

During the development of the well by means of overpumping with the suction of a motor pump located at 440 m, 300 m3/h were reached pumping during 24 hours with a level drop stabilised at 1.7 m, which gives credit to a good transmission. The water came up in a clear form and without turbidity at a temperature of 22° C. During the last 24 hours some samples were taken for testing every two hours. Once the equipment is dismantled, it is checked with an interior diameter that there were no landslides. The interior diameter of 650 mm goes through the bottom.

Once the hydraulic performance of the well is known and once the flow-drop curve is established, along with the data of the physicochemical and biological analysis of the water, the membrane packet (9) is projected with the program: LG NANO H2O Q+V2.3 until searching for the number and the type of membrane that guarantees the required quality and quantities.

From 8-inches membranes, having 24 tubes in four levels of six tubes per level and 5 membranes, a LGSW440ES tube-type, we will compose a membrane packet (9) that takes up a diameter that fits snug inside the borehole.

It can be seen that if we have 6 tubes with 5 membranes that are grouped around a central tube (brine manifold) of a 219 mm diameter, these would be fitted in a 635 mm diameter, leaving a space of ±12.5 mm that it is considered to be adequate.

With this same provision, three other groups will be placed in order to achieve the four levels of 6×5×4=120 membranes.

The obtained hydraulic data during the well (4) development, the analysis and the temperatures, they were introduced in the program Q+projection software of "NanoH2O, of which a summary of the presented data is attached, which is sorted by channels.

Feed Flow (Channel 1) (Provided Via the Borehole)
RO Feed flow 231 m3/h
Stage 1
Vessels 24
Elements 5
Number of elements 120
ERD type: one
Feed TDS 31.999 ppm
Osmotic Pressure Feed 22.92 bar
Temp 22° C.
Feed Pressure 44.35 bar (provided via the well suggestion)
Concentrate Flow (Channel 2)
Concentrate flow 148 m3/h (provided via the suction of the motor pump (7) of the of the concentrate duct (5)) Recovery 64.07%
Osmotic Pressure Concentrate 35.69 bar
Drop Pressure 1.2 bar (lost through the 5-membranes tube)
Permeate Flow (channel 3)
Permeate flow 83 m3/h (provided via the motor pump (8) of the permeate duct (6), which consists of a bottom atmospheric pressure
chamber connected and the duct itself)
Recovery 35.93%
Permeate TDS 221 ppm It is planned this way to group together 6 five-membrane tubes in series which are connected to the concentrate common manifold through channel 2 (brine) on a first level, and a second group of the same characteristics on a second level. A third group would be on a third level and finally a forth group would be on a forth level, making a total of 24 five-membrane tubes, which would have permeate manifolds (channel 3) that converge the duct (6) of the permeate which is located at the bottom of the borehole (4).

The brine pump (7) should pump 65% of the feeding water causing a dynamic level drop that compensates the loading losses caused by the flow transport of raw water thorough the duct (4) (downward direction), apart from the loss of a membrane packet (9), and the load loss of the ascending flow of the brine, inside the duct (5), to the pump (7) which carries it until pouring it to the outlet.

This load loss is seen when comparing the difference among the dynamic levels between the borehole (4) and the duct (5) of the brine.

By calculating an average transport speed of 0.3 m/s in the ring section that is between the borehole (4) and the largest diameter piping, the load loss will be 3 mca, in addition to the dynamic level drop which was measured in the duct (4) development phase that will be around 1.7 mca. This means that the total load loss caused by the feed raw water flow will be 4.7 mca.

The load loss obtained in the membrane packet (9) (feed pressure-concentrate pressure) obtained by the NanoH2O is 1.2 bar.

Equally, the load loss in the piping of the well of the brine (ascending flow) for a transport speed of 0.9 m/s all the way to the pump (7) will be 2.5 mca.

These losses add up 4.7+12.4+2.5=19.6 mca.

The pump suction level required by the brine motor pump (7) (4 m) to determine its installation minimum depth must be added to the slope:

19.6+4=23.6 m.

30 m are adopted as the installation depth of the brine motor pump (7).

In order to select the motor pump (7), this load (19.6) will have to be taken into account. To this load, the load caused at the 30 m of the pressure pipe (10) till the outlet (1.5 m) will be added. This way the height the motor pump to overcome results in 21.1 m, the flow to be pumped being 65% of the feed one, that is, 0.65×231=150 m3/h, the required power being 18 kW.

As membranes are developed to permeate at atmospheric pressure or at very low pressure≥(1 bar), it will be necessary to connect the permeate (channel 3) with an area being at a pressure similar to the atmospheric one.

In order to achieve this objective, a tube that will act as an air vent is connected to the bottom of the duct (6) so that it could be at atmospheric pressure.

Inside this duct (6), at the bottom, a motor pump (8) being able to extract to the surface the whole volume of permeate water is installed.

The permeate flow will be 36% of the feed corresponding one, that is: 0.36×231=83.16 m3/h.; taking into account that the permeate chamber is located at a depth of 440 m.

Therefore, the power required by the osmosis method will be 18.5+132=150.5 kW that are necessary to obtain 83.16 m3/h of permeate water, with a specific power ratio of 150.5/83.16=1.809 kw/m3.

The maximum dimensions in diameter of the motor pumps determine the minimum diameter of the two ducts to be installed inside the borehole.

However, the duct (5) of the brine (concentrate) works at low differential pressure between the interior and exterior walls. Therefore, it is not subject to big loads in spite of the depth, excepting its own weight and the osmosis equipment weight.

However, the duct (6) of the permeate, in addition to the described loads, because of being hollow and at atmospheric pressure as it is submerged at 440 m, it is subject to an external pressure that can make it collapse. Therefore, its thickness and material resistance should be duplex stainless steel with an elastic limit of 450 N/mm2 calculated from a □=p*r/t=44*30/0.6=2200 Kg/cm2, complying with the minimum thickness of 6 mm, in diameter 0.6 m.

The thickness that should be adopted for the two parallel pipes that physically form both ducts (5 and 6) that will be installed inside the borehole (4) at a depth of 450 m is of 3 mm in duplex quality, this is to say, the two ducts (permeate (6) and concentrate (5)) will be duplex pipes (270×3) connected by one double flange in lengths of 12 m. The total equipment weight is then, including the osmosis plant, 23 Tm of dry weight and 20 Tm when it is submerged in the duct inside de water.

Another alternative would be arranging the concentric pipes sharing the flanges that will have ports available in order to give distance and continuity.

The portico and the winch that are used for its assembly will be measured so that they can raise 25 Tonnes.

These calculations, sizes and method are good for the case when both ducts (brine (5)+permeate (6)) would have to work on the sea bed hanging from a floating platform (11), and being installed in both ducts (14) and the membrane packet (9) hanging from two headframes (13) were assembled by means of drive shaft joint.

The floating platform (11) is anchored to the sea bed with cables (12) that affix it to fixed moorings on the sea bed.

The permeate motor pump (8) works in an inverted position in order to propel the permeate water through two hosepipes (16) that carry the water through the sea bed to the coast for the use thereof.

In the unlikely event of the borehole (4) being drilled on an impermeable ground, producing a dry well near the sea, the wellhead will be connected to the coast through a packet of gravel filters in order to supply the borehole (4) with seawater. This way, the osmosis method could be carried out following the principles and characteristics patented here.

The nature and details of the present invention being sufficiently described, as well as the way to put it into practice, making a more extensive explanation is not considered so that any expert in the art could understand the importance and advantages that derive from it. It is placed on the record that, within the specialization, the invention could be implemented in other ways that differ in detail to the one described here, as an example, and to which the requested protection will equally apply, provided that its fundamental principle is not altered, changed or modified.

Modifications and substitutions by one of ordinary skill in the art are considered to be within the scope of the present invention, which is not to be limited except by the allowed claims and their legal equivalents.

The invention claimed is:

1. A system for the desalination of seawater or salty waters by use of reverse osmosis, comprising: a borehole (4) provided on a coastal land or over a seabed, wherein, a duct (5) in the coastal land (14) or in the seabed and one permeate duct (6) in coastal land or in seabed are installed in the borehole (4), said duct (5) and permeate duct (6) interconnected proximate a bottom region through a membrane packet (9) disposed in said duct (5), wherein the membrane packet (9) is arranged in a way that salty water, supplied from the borehole (4), flows towards the membrane packet (9) because of the suction of a motor pump (7), which is installed at a shallow depth inside the duct (5) in land or in seabed, providing an ascending flow of salt concentrated salty water to a marine outlet, and wherein a diluted permeate flow from the membrane packet (9) will drain to a bottom atmospheric pressure chamber connected to the permeate duct (6, and wherein a motor pump (8) is provided to extract it for the use thereof.

2. A method for diluting or concentrating solutions using the system for the desalination of seawater or salty waters by using of reverse osmosis, according to claim 1, characterised in that when the coastal lands where the borehole goes through are low permeable, the feeding water is provided by the wellhead from outside, and wherein the well is jacketed in its whole depth, sealing it, in order to avoid water losses and unwanted contaminations.

3. A method for diluting or concentrating solutions using the system for the desalination of seawater or salty waters by reverse osmosis according to claim 1 which is characterised in that:
   the motor pump (7) is installed at a shallow depth in the duct (5) in land or (14) in seabed in order to extract salt concentrated salty water; and
   the motor pump (8) is installed in a bottom atmospheric pressure chamber connected to duct (6) in land or (16) in seabed in order to extract the permeate or desalinized water.

4. A method for the desalination of salty water by use of a reverse osmosis process, said method comprising the acts of:
   creating a borehole (4) on one of a coastal land or over a seabed, said borehole (4) including a bottom region disposed in said salty water;
   providing a first well (5) in said borehole (4), said first well (5) having a top portion and an open bottom portion, said open bottom portion disposed in and in fluid communication with said salty water, said first well (5) configured for providing a flow of salt concentrated salty water to said top portion of said first well (5);
   providing a first pump (7) disposed in said first well (5) proximate said top portion of said first well (5), said first pump (7) configured for drawing said salty water from said borehole (4) into said open bottom region of said first well (5);

providing a second well (6) in said borehole (4), said second well (6) having a top portion and a sealed bottom portion, said sealed bottom portion disposed in said salty water and not in fluid communication with said salty water, said second well (6) configured for receiving desalinized water from said first well (5);

providing a desalinization membrane (9) disposed in said open bottom region of said first well (5), said desalinization membrane (9) configured for receiving said salty water from said borehole (4) through said open bottom region of said first well (5) caused by said first pump (7) drawing said salty water from said borehole (4) into said open bottom region of said first well (5), and for providing a quantity of desalinized water through a first outlet in said desalinization membrane (9) fluidly coupled to said closed bottom region of said second well (6), said desalinization membrane (9) configured for providing a quantity of concentrated salt water through a second outlet into said bottom region of said first well (5) to be drawn to said top portion of said first well (5) by means of said first pump (7); and providing a second pump (8) disposed in said second well (6) proximate said bottom portion of said second well (6), said second pump (8) configured for pumping said desalinized water from said bottom portion of said second well (6) to said top portion of said second well for use as desalinized water.

\* \* \* \* \*

UNITED STATES PATENT AND TRADEMARK OFFICE
CERTIFICATE OF CORRECTION

PATENT NO. : 10,781,576 B2  
APPLICATION NO. : 15/573064  
DATED : September 22, 2020  
INVENTOR(S) : Manuel Lahuerto Romeo Page 1 of 1

It is certified that error appears in the above-identified patent and that said Letters Patent is hereby corrected as shown below:

On the Title Page

Item (54) and in the Specification, Column 1, Lines 1-3, The Title of the invention is corrected to read: "METHOD AND MEANS FOR DILUTING OR CONCENTRATING SOLUTIONS, APPLIED TO PROCESSES FOR THE DESALINIZATION OF WATER"

Signed and Sealed this
Tenth Day of November, 2020

Andrei Iancu
*Director of the United States Patent and Trademark Office*